United States Patent
Horton, Jr. et al.

(10) Patent No.: US 6,606,352 B2
(45) Date of Patent: Aug. 12, 2003

(54) METHOD AND APPARATUS FOR CONVERTING BETWEEN BYTE LENGTHS AND BURDENED BURST LENGTHS IN A HIGH SPEED MODEM

(75) Inventors: John Daniel Horton, Jr., Alpharetta, GA (US); Scott Hollums, Duluth, GA (US); Chris Roussel, Alpharetta, GA (US)

(73) Assignee: Broadcom Corporation, Irvine, CA (US)

( * ) Notice: Subject to any disclaimer, the term of this patent is extended or adjusted under 35 U.S.C. 154(b) by 37 days.

(21) Appl. No.: 09/794,538

(22) Filed: Feb. 27, 2001

(65) Prior Publication Data

US 2001/0010096 A1 Jul. 26, 2001

Related U.S. Application Data

(63) Continuation of application No. 09/483,559, filed on Jan. 14, 2000, which is a continuation-in-part of application No. 09/430,821, filed on Oct. 29, 1999.
(60) Provisional application No. 60/115,998, filed on Jan. 15, 1999.

(51) Int. Cl.[7] ............................................. H04L 5/16
(52) U.S. Cl. ...................... 375/222; 370/395; 370/401; 370/432; 370/443
(58) Field of Search .......................... 375/222; 370/352, 370/395, 421, 432, 632; 395/200.55; 709/232

(56) References Cited

U.S. PATENT DOCUMENTS

| | | | |
|---|---|---|---|
| 5,533,004 A | 7/1996 | Jasper et al. | 370/11 |
| 5,734,833 A * | 3/1998 | Chiu et al. | 395/200.55 |
| 5,963,557 A * | 10/1999 | Eng | 370/432 |
| 6,236,678 B1 * | 5/2001 | Horton et al. | 375/222 |
| 6,349,138 B1 * | 2/2002 | Doshi et al. | 380/200 |

FOREIGN PATENT DOCUMENTS

| | | |
|---|---|---|
| WO | WO 97/16046 | 5/1997 |
| WO | WO 98/47236 | 10/1998 |

* cited by examiner

*Primary Examiner*—Shuwang Liu
(74) *Attorney, Agent, or Firm*—Sterne, Kessler, Goldstein & Fox P.L.L.C.

(57) ABSTRACT

Requests are processed to transmit data packets upstream from a cable modem to a cable headend in a manner that minimizes the use of CPU operations and/or memory capacity. Data packets to be transmitted upstream are stored at the cable modem. The data packets each have a given transmission data byte length value. Burst profiles are received successively at the cable modem. Each time a new bust profile is received, a set of physical data length values corresponding to respective transmission data byte length values is calculated from the parameters of the received burst profile. The calculated set of physical data length values is stored in memory so the individual values can be retrieved from the transmission data byte length values again and again, rather than being re-calculated each time a conversion is made from transmission data byte length values to physical data length values. The same set of physical data length values is used until a new burst profile is received by the cable modem.

20 Claims, 11 Drawing Sheets

METHOD AND APPARATUS FOR CONVERTING BETWEEN BYTE LENGTHS AND BURDENED BURST LENGTHS IN A HIGH SPEED MODEM

CROSS-REFERENCE TO RELATED APPLICATIONS

This application is continuation of Ser. No. 09/483,559 filed Jan. 14, 2000, which is a continuation in part of Ser. No. 09/430,821 filed Oct. 29, 1999. This application further claims benefit of No. 60/115,998 filed Jan. 15, 1999.

BACKGROUND OF THE INVENTION

This invention relates to data over cable transmission and, more particularly, to a method and apparatus for generating requests to transmit data packets upstream from a cable modem to a cable headend.

To coordinate upstream data transmission from a number of cable modems to a headend in a cable transmission system so there is no collision among a number of cable modems using the same channel, the cable modems send request messages to the headend that tell the headend the amount of bandwidth needed to transmit the data. The bandwidth expressed in minislots is sometimes referred to as the physical length (PHY L) of the data to be transmitted. The PHY L required to transmit a data packet having a given byte length (BL) varies depending upon the overhead imposed by the physical layer of the cable system, such as the preamble, guard band, forward error correction, and padding. The parameters that determine the overhead are part of a burst profile transmitted to each cable modem through uniform channel descriptor (UCD) messages. When a request to transmit data is made by a modem, the BL of the data packet to be transmitted is converted to the PHY L by calculations based on a formula including the parameters. When a grant message is returned to the requesting modem, it tells the requesting modem which minislots to use for upstream transmission of the data packet.

If the cable transmission system is capable of fragmented data transmission, i.e., transmitting a data packet in two or more fragments, the grant message sent from the headend to the requesting cable modem includes the PHY L of the data segment to be transmitted in the allotted bandwidth. Before transmitting this data fragment, its PHY L must be converted to a BL value. This conversion is also made by calculations based on the formula including the parameters.

SUMMARY OF THE INVENTION

According to the invention, requests are generated to transmit data packets upstream from a cable modem to a cable headend in a manner that minimizes the use of CPU operations and/or memory capacity. Data packets to be transmitted upstream are stored at the cable modem. The data packets each have a given transmission byte length value. Successive burst profiles are received from time to time at the cable modem. Each time a new burst profile is received, a set of physical data length values corresponding to respective transmission byte length values is calculated from the parameters of the received burst profile. The calculated set of physical data length values is stored in memory so the individual physical data length values can be retrieved from the transmission byte length values again and again, rather than being re-calculated each time a conversion is made from transmission byte length values to physical data length values. The same set of physical data length values is used until a new burst profile is received by the cable modem.

Preferably, the calculated set of physical data length values is stored in a forward lookup table so the respective transmission byte length values represent the addresses to the physical data length values in the forward lookup table and the data length conversion can be accomplished by simply addressing the forward lookup table.

If data packets are transmitted in fragmented form, a calculated set of transmission byte length values is preferably stored in a reverse lookup table so respective physical data length values represent the addresses to the transmission byte length values in the reverse lookup table and the transmission byte length conversion can be accomplished by simply addressing the reverse lookup table. In this case, the physical data length conversion can either be carried out with a forward lookup table or an iterative search of the reverse lookup table that compares retrieved transmission byte values with the desired value in order to find the physical data length.

DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENTS

Figure 1:
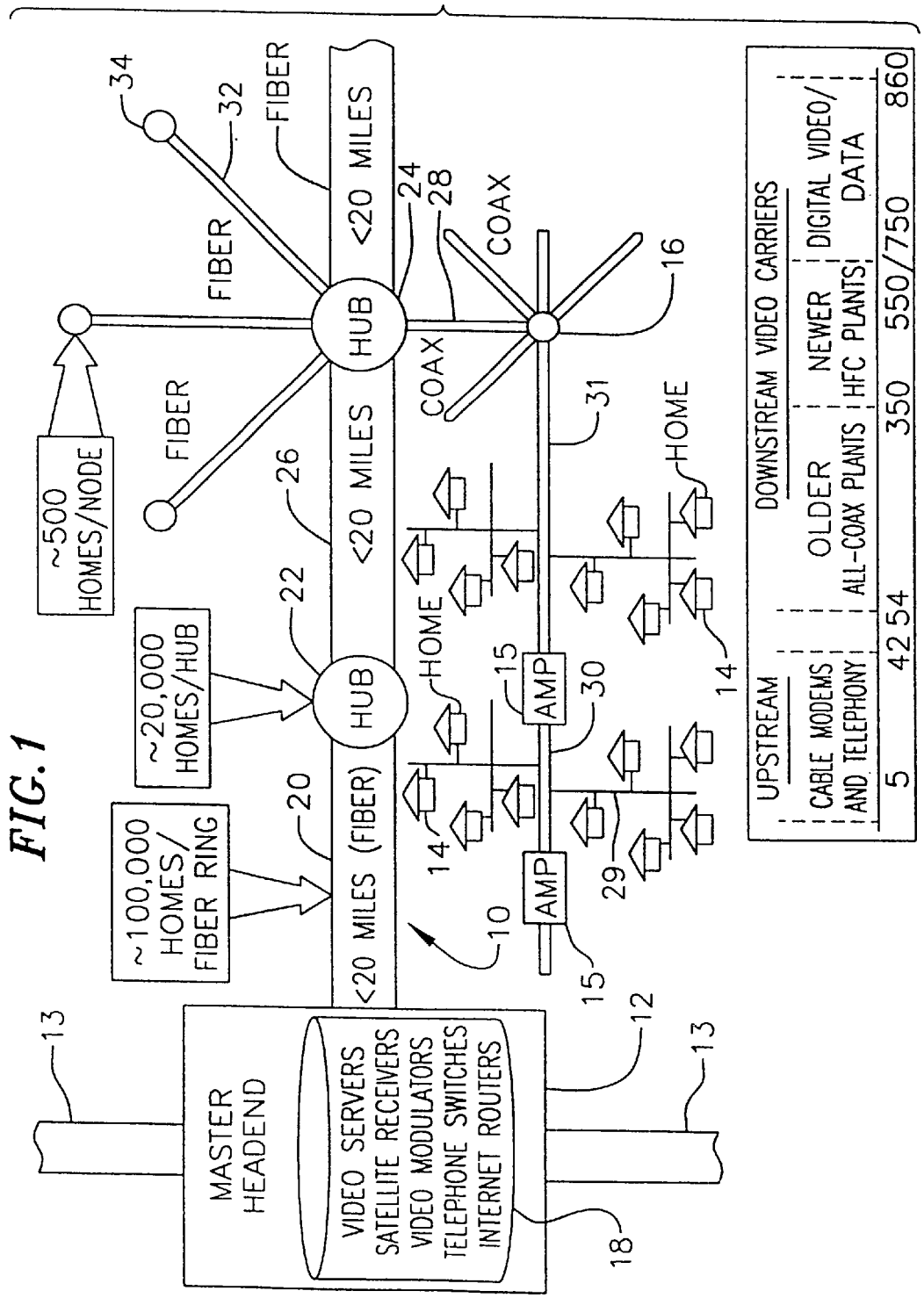
FIG. 1 is a schematic diagram of a cable transmission system including a headend with a cable modem termination system connected by a hybrid fiber coaxial (HFC) network to a plurality of cable modems.

In a cable modem system, a headend or cable modem termination system (CMTS) is located at a cable company facility and functions as a modem which services a large number subscribers. Each subscriber has a cable modem (CM). Thus, the cable modem termination system must be capable of facilitating bidirectional communication with any desired one of the plurality of cable modems.

As used herein, the cable modem termination system (CMTS) is defined to include that portion of a headend which effects communication with a plurality of cable modems. A typical cable modem termination system includes a burst receiver, a continuous transmitter and a medium access control (MAC).

The cable modem termination system communicates with the plurality of cable modems via a hybrid fiber coaxial (HFC) network, wherein optical fiber provides communication to a plurality of fiber nodes and each fiber node typically serves approximately 500 to 2,000 subscribers. These subscribers communicate with the node via a shared coaxial cable. It is this sharing of the common coaxial cable which necessitates that the number of cable modems attached thereto be limited so as to mitigate the likelihood of undesirable bit rate reductions which inherently occur when an excessive number of cable modems communicate simultaneously over a single coaxial cable.

The hybrid fiber coaxial network of a cable modem system utilizes a point-to-multipoint topology to carry out communication between the cable modem termination system and the plurality of cable modems. Frequency domain multiple access (FDMA)/time division multiplexing (TDM) is used to facilitate communication from the cable modem termination system to each of the cable modems, i.e., in the downstream direction. Frequency domain multiple access (FDMA)/time domain multiple access (TDMA) is used to facilitate communication from each cable modem to the cable modem termination system, i.e., in the upstream direction.

The cable modem termination system includes a downstream modulator for facilitating the transmission of data communications therefrom to the cable modems and an upstream demodulator for facilitating the reception of data communications from the cable modems.

Typically, the downstream modulator of the cable modem termination system utilizes either 64 QAM or 256 QAM in a frequency band of 54 MHz to 860 MHz to provide a data rate of up to 56 Mbps. Since the upstream channel has a much lower data rate requirement, the upstream demodulator typically uses either QPSK or 16 QAM in a frequency range of 5 MHz to 42 MHz to provide a data rate of up to 10 Mbps.

The asymmetric data throughput defined by the upstream channel requiring a much lower data rate than the downstream channel results from the inherently larger amount of data which is communicated via the downstream channel during pay-per-view, Internet access and the like, wherein a video signal is communicated via the downstream channel, while only control signals such as those associated with viewing of the video signal are communicated via the upstream channel. Thus, the downstream channel requirement may exceed 1.5 Mbps, while the upstream channel requirement may be as low as 16 Kbps.

In the future, it is expected that cable transmission in the upstream direction will become broader band, because digital television transmission requires less bandwidth than analog television transmission.

Each cable modem includes an upstream modulator for facilitating the transmission of data to the cable modem termination system and a downstream demodulator for receiving data from the cable modem termination system. The upstream modulator of each cable modem uses either QPSK or 16 QAM within the 5 MHz to 42 MHz bandwidth of the upstream demodulator and the downstream demodulator of each cable modem utilizes either 64 QAM or 256 QAM in the 54 MHz to 860 MHz bandwidth of the downstream modulator (in North America).

Contemporary cable modem systems operate on a plurality of upstream channels and utilize time division multiple access (TDMA) in order to facilitate communication between a plurality of cable modems and a single cable modem termination system on each upstream channel. Typically, between 250 and 500 cable modems communicate with a single cable modem termination system on a given upstream channel.

In order to accomplish TDMA for upstream communication, it is necessary to assign time slots within which cable modems having a message to send to the cable modem termination system are allowed to transmit. The assignment of such time slots is accomplished by providing a request contention area in the upstream data path within which the cable modems are permitted to contend in order to place a message which requests additional time in the upstream data path for the transmission of their message. (Small data packets are sometimes also transmitted in contention regions.) The cable modem termination system responds to these requests by assigning time slots to the cable modems making such a request, so that as many of the cable modems as possible may transmit their messages to the cable modem termination system utilizing TDMA and so that the transmissions are performed without undesirable collisions.

Because of the use of TDMA, the cable modem termination system must use a burst receiver, rather than a continuous receiver, to receive data packets from cable modems via upstream communications. As those skilled in the art will appreciate, a continuous receiver can only be utilized where generally continuous communications (as opposed to burst communications as in the present invention) are performed, so as to substantially maintain timing synchronization between the transmitter and the receiver, as is necessary for proper reception of the communicated information. During continuous communications, timing recovery is a more straightforward process since signal acquisition generally only occurs at the initiation of such communications. Thus, acquisition is generally only performed in continuous receivers once per continuous transmission and each continuous transmission may be very long.

However, the burst communications inherent to TDMA systems require periodic and frequent reacquisition of the signal. That is, during TDMA communications, the signal must be reacquired for each separate burst transmission being received.

Since continuous receivers generally only acquire the signal once, the need to minimize acquisition time is much less critical in continuous receivers than in burst receivers, wherein acquisition must be performed for each separate burst, and therefore occurs quite frequently. Thus, there is a strong motivation to minimize acquisition time in burst receivers, so as to enhance overall data transmission efficiency and throughput. As such, it is beneficial to provide techniques which enhance the speed at which data packets transmitted according to TDMA methodologies may be acquired by a burst receiver, such as that of a cable modem termination system.

Referring now to FIG. 1, a hybrid fiber coaxial (HFC) network 10 transmits data between a headend 12, which includes at least one cable modem termination system, and a plurality of homes 14, each of which contains a cable modem. Such hybrid fiber coaxial networks are commonly utilized by cable providers to provide Internet access, cable television, pay-per-view and the like to subscribers.

Approximately 500 homes 14 are in electrical communication with each node 16, 34 of the hybrid fiber coaxial network 10, typically via coaxial cable 29, 30, 31. Amplifiers 15 facilitate the electrical connection of the more distant homes 14 to the nodes 16, 34 by boosting the strenth of the electrical signals so as to desirably enhance the signal-to-noise ratio of such communications and by then transmitting the electrical signals over coaxial conductors 30, 31. Coaxial conductors 29 electrically interconnect the homes 14 with the coaxial conductors 30, 31, which extend between amplifiers 15 and nodes 16, 34.

Each node 16, 34 is electrically connected to a hub 22, 24, typically via an optical fiber 28, 32. The hubs 22, 24 are in communication with the headend 12, via optical fiber 20, 26. Each hub is typically capable communicating with approximately 20,000 of homes 14.

The optical fiber 20, 26 extending intermediate the headend 12 and each hub 22, 24 defines a fiber ring which is typically capable of communicating between approximately 100,000 of homes 14 and the headend 12.

The headend 12 may include video servers, satellite receivers, video modulators, telephone switches and/or Internet routers 18, as well as the cable modem termination system. The headend 12 communicates via transmission line 13, which may be a T1 or T2 line, with the Internet, other headends and/or any other desired device(s) or network.

Figure 2:
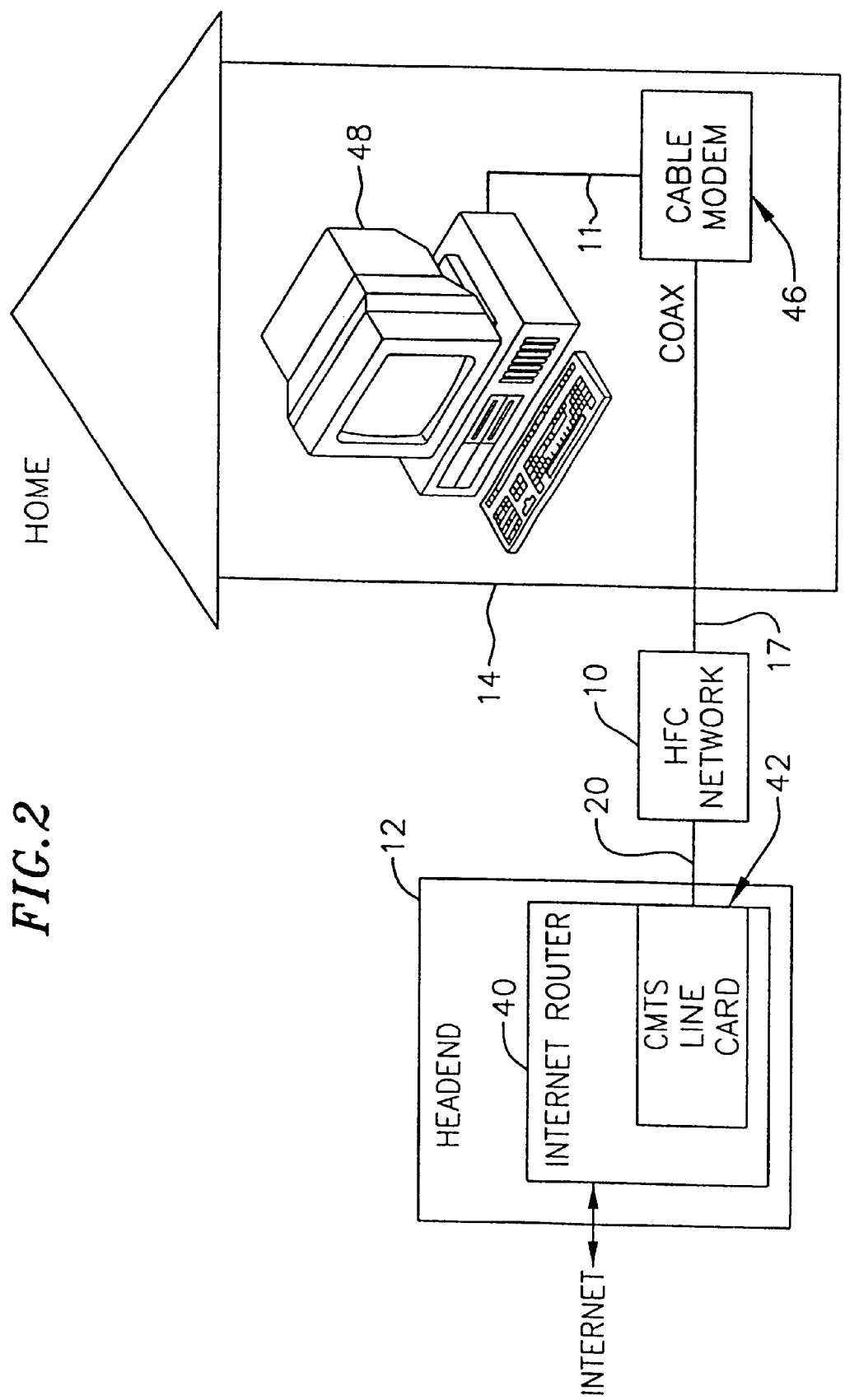
FIG. 2 is a schematic diagram of the headend and a cable modem in one home of the cable transmission system.

Referring now to FIG. 2, a simplified block diagram shows the interconnection of the headend 12 and an exemplary home 14, wherein a cable modem 46 communicates with a cable modem termination system at headend 12, embodied as a line card 42, via hybrid fiber coaxial network (HFC) 10.

More particularly, a personal computer 48, disposed within the home 14, is connected via cable 11 to the cable modem 46 which communicates via coaxial cable 17 with the hybrid fiber coaxial network 10. Network 10 in turn communicates via optical fiber 20 with the line card or cable modem termination system (CMTS) 42 of the headend 12. Internet router 40 permits communication between the headend 12 and the Internet or any other desired device or network.

Figure 3:
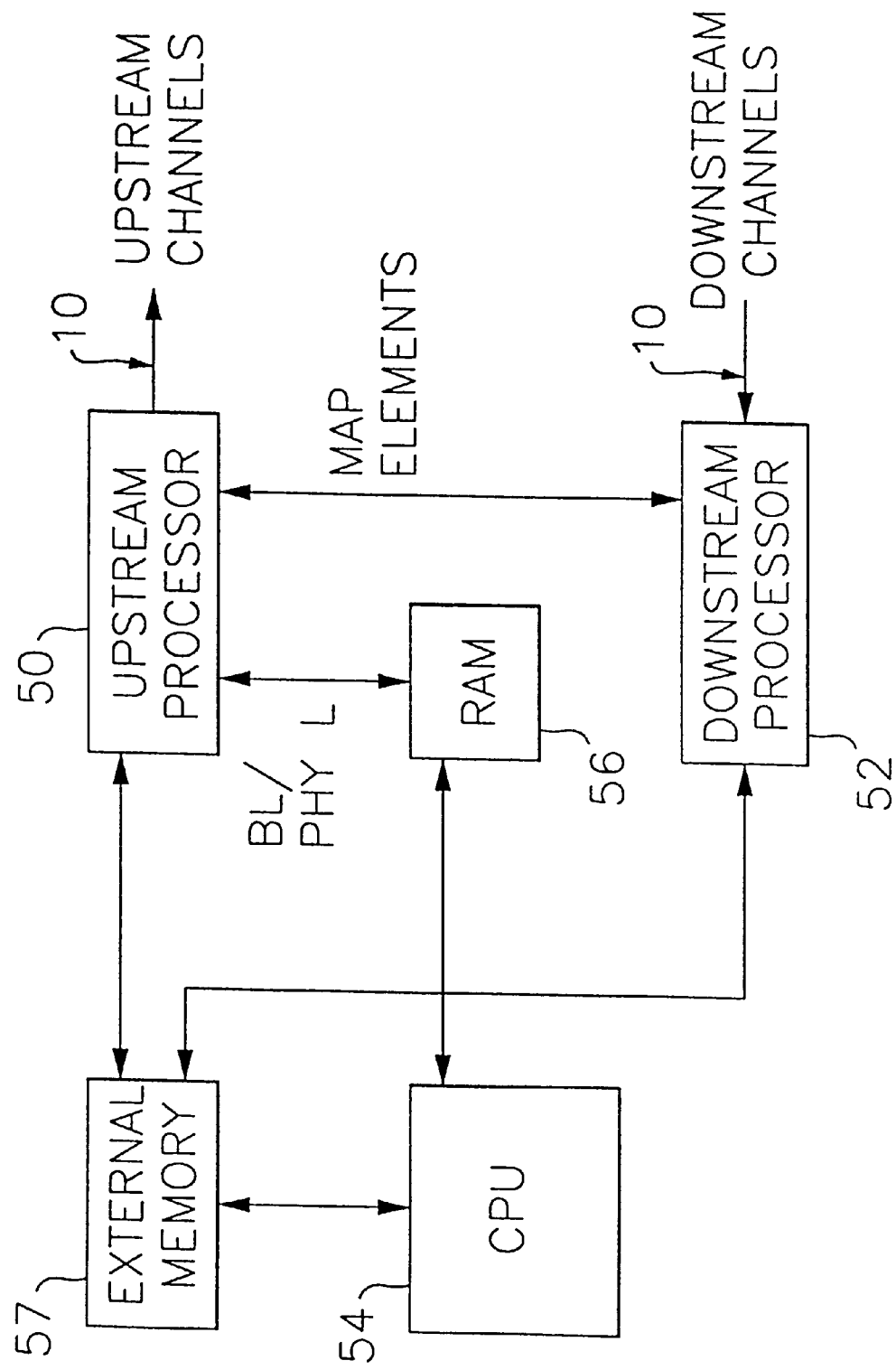
FIG. 3 is a schematic diagram of the cable modem of FIG. 2 in more detail.

As shown in FIG. 3, each cable modem 46 has an upstream processor 50 coupled to the upstream channels of network 10 and a downstream processor 52 coupled to the downstream channels of network 10. Upstream processor 50 sends, among other things, time slot request messages and ranging and station maintenance request messages on an assigned one of the upstream channels of HFC network 10. Downstream receiver 52 intercepts, among other things, bandwidth allocation MAP messages that include minislot grant messages and also intercepts upstream channel descriptor (UCD) messages that include burst profiles carried on the downstream channels of HFC network 10. A central processing unit (CPU) 54 is coupled to upstream processor 50 and downstream receiver 52. CPU 54 has a random access memory (RAM) 56 that can be rapidly accessed by CPU 54 because it is preferably on the same integrated circuit chip as CPU 54. For this reason RAM 56 usually has limited storage capacity. CPU 54 is also coupled to an external memory 57 that can only be accessed slowly because it is off chip. External memory 57 usually has a large storage capacity and serves other functions and components in the cable modem. By way of example, external memory 57 could be a SDRAM. A lookup table described in more detail below is stored in RAM 56. Preferably, upstream processor 50, downstream receiver 52, CPU 54, including a memory controller for interfacing with External memory 57, and RAM 56 are all resident on a single integrated circuit chip and external memory 57 is external to the single chip. Data packets representing information to be transmitted on an upstream channel are stored in external memory 57. CPU 54 sends the time slot request messages for the data packets stored in External memory 57 and couples such messages to upstream processor 50 to be sent on an assigned channel to a cable modem termination system (CMTS) at the cable headend. From time to time CPU 54 also sends commands to upstream processor 50 50 to transmit ranging and station maintenance requests on the assigned upstream channel. A time slot request message includes a field that contains the number of minislots in the assigned upstream channel required to transmit a particular data packet or part of a data packet, including the overhead imposed by the physical layer of the cable system such as preamble, guard band, forward error correction (FEC), and padding. The byte length of the data packet to be transmitted, is designated BL herein. The number of minislots required to transmit this data packet burdened with the overhead imposed by the physical layer of the system composed of the preamble, guard band, forward error correction (FEC), padding, etc. in terms of minislots is called physical length herein (PHY L). PHY L can be calculated from the BL based on the parameters of the burst profile. At initialization of a cable modem and from time to time as determined by the cable operator, the CMTS sends a burst profile downstream, including the parameters that permit calculation of PHY L from BL. The CMTS also sends bandwidth allocation MAPS including time slot grant messages to downstream processor 52 when the cable modems request bandwidth to transmit data packets.

In a first mode of operation, the system is only capable of sending the entire data packet at one time in a contiguous group of minislots. In a second mode of operation, the system is also capable of fragmenting a data packet and sending the data packet in two or more groups of minislots at different times, as described further below. In the first mode of operation, a grant message is not sent by the CMTS until a sufficient number of minislots are available to send the entire data packet, i.e., the PHY L of the entire data packet. In this mode of operation, when a grant message is received, the entire data packet is sent to upstream processor for upstream transmission with a standard preamble and other message components. In the second mode of operation, there are two ways fragmentation takes place when the granted PHY L is less than the PHY L of the data packet to be transmitted—piggybacking and multiple grants. According to the first way, a portion of the data packet is sent to upstream processor 50 for upstream transmission piggybacked with a field that indicates the physical length of the remainder of the data packet to be transmitted as a further request. According to the second way, multiple grant messages are sent to a requesting cable modem allocating separate multiple time slots In either case, to determine the BL of the fragment of the data packet transmitted, the BL must be calculated from the PHY L, based on the parameters of the burst profile.

Reference is made to application Ser. No. 09/430,821 filed Oct. 29, 1999 for a further description of the the process for transmitting data packets on an upstream channel and for fragmenting the data packets.

Because it would require complex hardware to carry out the conversion between the BL values and the PHY L values and these values do not change often, i.e., only when the burst profiles are changed, they are calculated by firmware in CPU 54 and stored in one or more tables until the burst profiles are changed.

In the first mode of operation, rather than calculating the PHY L each time that a time slot request message is generated, the values of PHY L corresponding to all values of BL are generated and stored in a forward lookup table in RAM 56. Each time that a new burst profile is received by downstream receiver 52, the PHY L values are re-calculated and the previously stored forward lookup table is replaced with a new updated table comprising the re-calculated PHY L values. Between receipt of new burst profiles the PHY L values are derived directly from the forward lookup table for use each time that a BL value is converted to a PHY L value for insertion in a time slot request message. As a result, expensive hardware is not needed to calculate the PHY L values, CPU 54 is not burdened each time that a BL to PHY L conversion needs to be made, and the conversion can be made without the delay encountered in calculating the PHY L value each time a conversion is made.

In the second mode of operation, the BL values are calculated from PHY L and stored in a reverse lookup table in RAM 56 to eliminate the need for expensive hardware to calculate the BL values, reduce the processing burden on CPU 54, and speed the conversion of PHY L values to BL values.

Figure 4A:
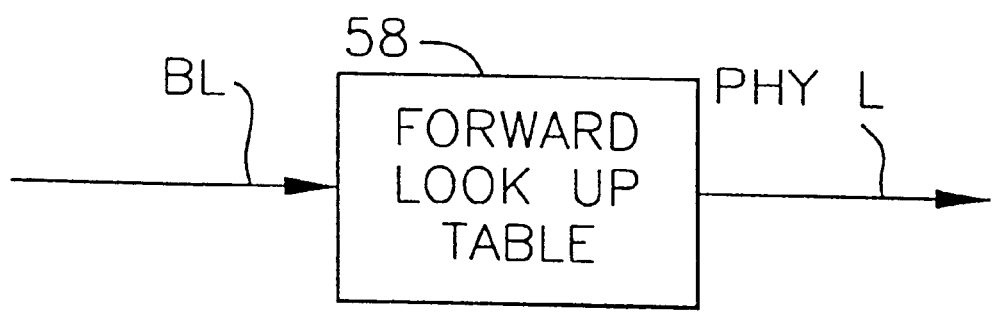
FIGS. 4A and 4B are diagrams of a forward lookup table and a reverse lookup table used to practice the invention.
Figure 4B:
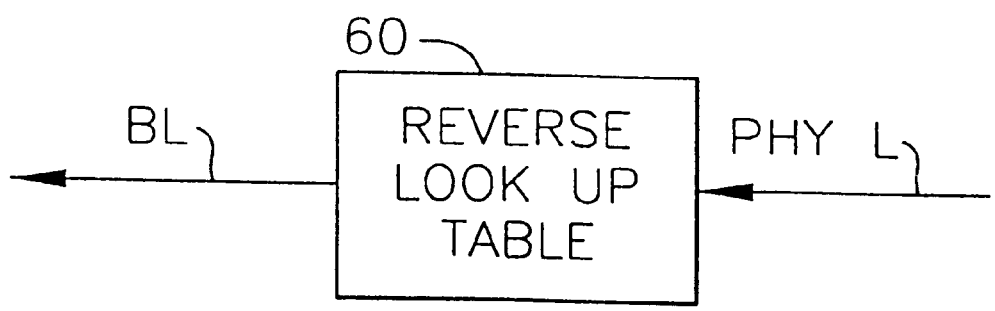

FIG. 4 depicts a forward lookup table 58 and a reverse lookup table 60 stored in RAM 56 to make the conversions described above. Forward lookup table 58 comprises a number of memory locations in RAM 56 having contiguous addresses in which the PHY L values are stored. Typically, the value of PHY L is represented by an eight bit word, resulting in 256 values of PHY L so an eight bit word is stored in each memory location. Typically, in an Internet application, BL can have up to 1454 bytes and varies consecutively from 64 to 1518. For this exemplary number of BL values, forward lookup table 58 has 1454 entries. (In other applications the BL can have from one to up to 8K bytes and the table must be sized accordingly.) A number of the entries are duplicative because there are more BL values than PHY L values. The index into forward lookup table 58 is the offset from the beginning of the table. If a table begins at address zero, the PHY L for BL having a value of 64 is at address 64.

Reverse lookup table 60 comprises a number of memory locations in RAM 56 having contiguous addresses; the BL values are stored in these memory locations and the PHY L values serve as the addresses to access these BL values. Reverse lookup table 58 has 256 entries, i.e., one entry for each PHY L address, and the value of BL stored in each memory cell is represented by a sixteen bit word to accommodate the maximium number of BL values. Because there are more BL values than PHY L values, the BL values stored in memory locations with adjacent addresses are not consecutive; the stored BL value in each memory location is the largest BL that will accommodate the corresponding PHY L.

Figure 5:
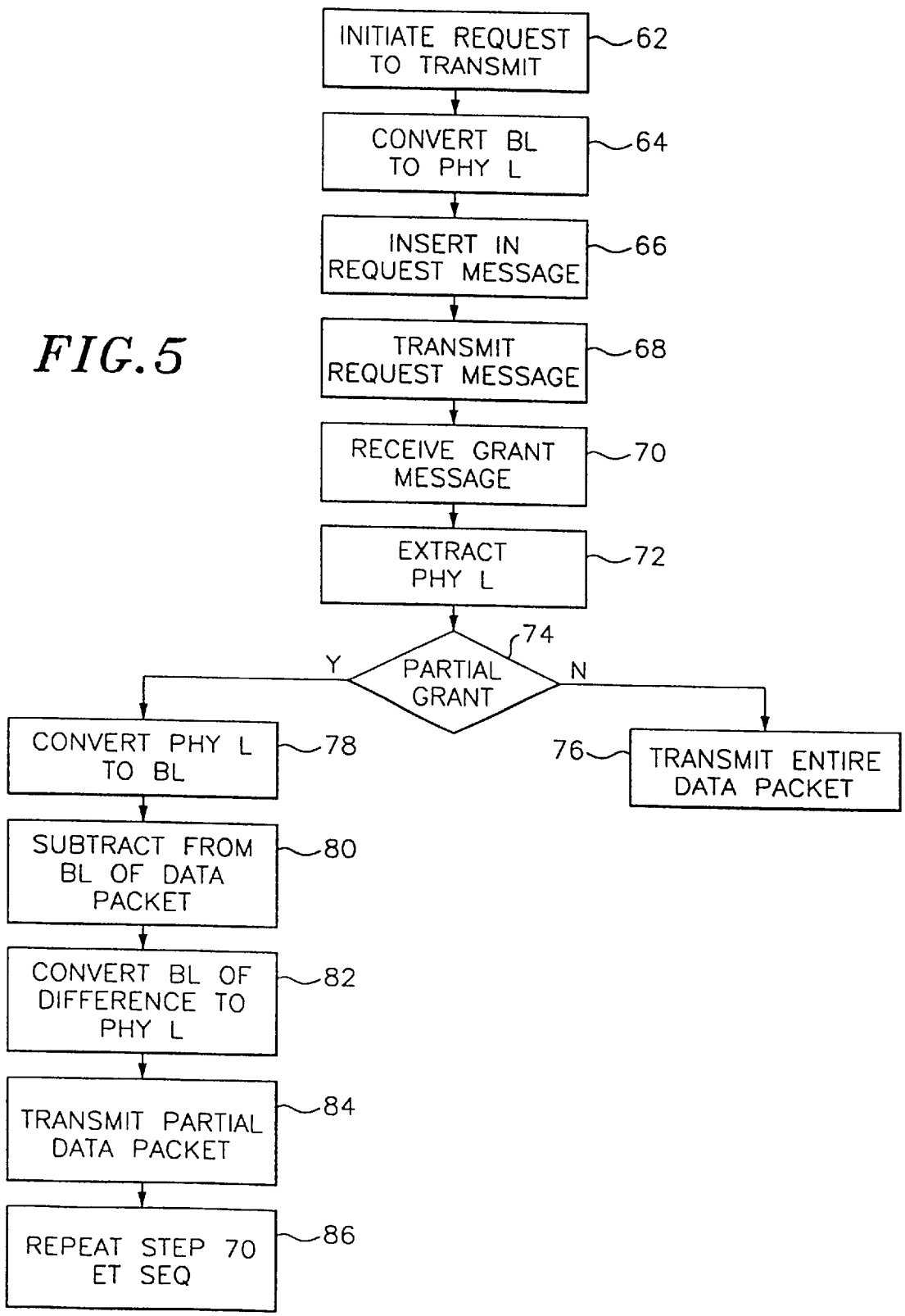
FIG. 5 is a flow diagram of the process for requesting the allocation of time slots to transmit data packets from a cable modem to the headend.

Hardware in processors 50 and 52 executes the operations for processing requests to transmit data packets upstream from a cable modem to the cable headend. Alternatively, these operations could be executed by firmware in CPU 54 which is part of the MAC. The tradeoff is time and CPU burden against hardware cost. These operations are illustrated in FIG. 5. As represented by a block 62, the hardware initiates a command, including a BL value, to generate a request message to transmit a data packet. As represented by a block 64, forward lookup table 58 (FIG. 4) is used by the hardware to convert the BL value to a PHY L value. As represented by a block 68, the PHY L value is inserted by the hardware into the request message. As represented by a block 68, the request message, including the PHY L value, is transmitted on the assigned upstream channel by Upstream processor 50 (FIG. 3). As represented by a block 70, Downstream receiver 52 (FIG. 3) receives a grant message including the PHY L value of the minislots allocated to the cable modem to transmit the data packet. As represented by a block 72, the PHY L value is extracted from the grant message by the hardware. As represented by a decision block 74, the grant message is examined by the hardware to determine whether it is a partial grant or a full grant. This determination is made by comparing the original requested PHY L value with the PHY L value extracted from the grant message. If the requested PHY L is greater than the granted PHY L, fragmentation is carried out. If the message identifies a full grant, the N path is followed from block 74 to a block 76, according to which the entire data packet stored in RAM 56 of CPU 54 is transmitted on the assigned upstream channel by Upstream processor 50. (In the first mode of operation there is a direct path from block 72 to block 76 since no partial grants are executed.)

If the message identifies a partial grant, the Y path is followed from block 74 to a block 78, according to which a PHY L value is converted to a BL value by reverse table 60 (FIG. 4) under control of the hardware. As represented by a block 80, the BL value derived in block 78 is subtracted by the hardware from the BL value of the entire data packet to form a difference BL value. As represented by a block 82, the difference BL value is converted by forward lookup table 58 to a difference PHY L value under control of the hardware. As represented by a block 84, the difference BL value is also used to select a partial data packet to be transmitted on the assigned upstream channel by Upstream processor 50 in the minislots allocated by the grant message received pursuant to block 70. The partial data packet transmitted pursuant to block 84 is accompanied by a further mini-slot request in the form of the difference PHY L value to transmit the remainder of the data packet. As represented by a block 86, the operations of block 70 and the blocks that follow are repeated until the entire data packet has been transmitted.

In one embodiment, both the forward and reverse conversions are carried out with a single lookup table to reduce the amount of RAM 56 required to carry out these conversions. Preferably, reverse lookup table 60 is used because it requires less memory space than forward lookup table 58 (in the above example, 256 bytes). Reverse lookup table 60 is used in the manner described above to convert PHY L to BL by directly addressing reverse lookup table 60 with PHY L as an address to access the BL value stored in the corresponding memory location of the table. An iterative search procedure, preferable a binary search, is used to convert from BL to PHY L; specifically, different PHY L values are iteratively applied to reverse lookup table 60 to find the BL value closest to the BL value to be converted, i.e., the desired BL value. The resulting address is the corresponding PHY L value.

Figure 6:
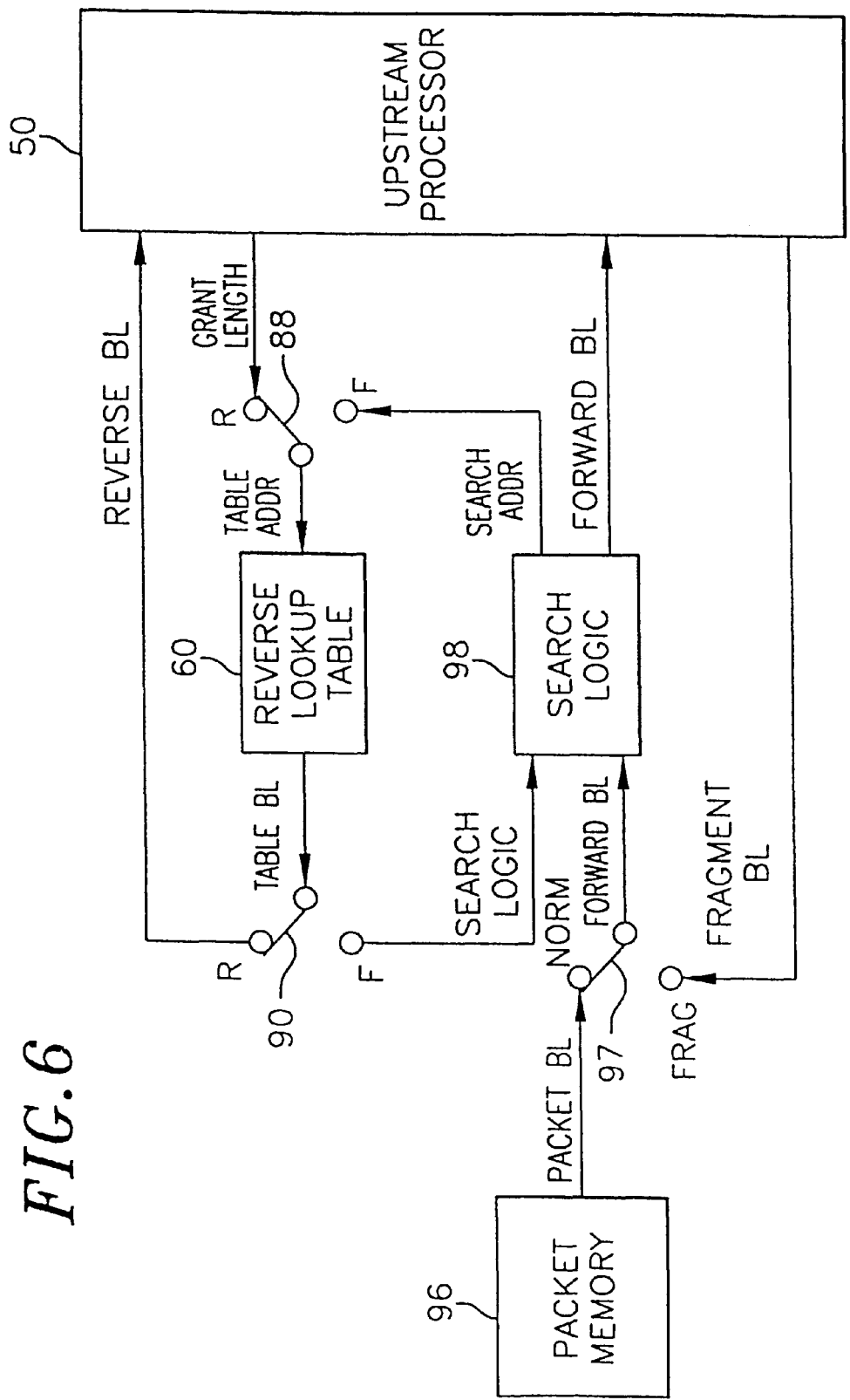
FIG. 6 is diagram of a single lookup table arranged to convert between transmission data byte and physical data length in both the forward and reverse directions.

FIG. 6 functionally illustrates how reverse lookup table 60 operates to carry out the conversion in both directions. A switch 88 is connected to the address input of reverse lookup table 60 and the output of reverse lookup table 60 is connected to a switch 90. Switches 88 and 90 are controlled by hardware, depending on whether a forward request or a reverse request is made to lookup table 60. When a grant message is received by upstream processor 50 (FIG. 3), a PHY L value is extracted from the grant message, switch 88 assumes a state R to connect upstream processor 50 to the address input of table 60, and switch 90 assumes a state R to connect the output of table 60 back to upstream processor 50. As a result, in this mode PHY L values are converted to BL values by directly accessing table 60 with a PHY L value as an address in the manner described above in connection with FIG. 4 and the BL values from reverse table 60 are subtracted from the BL values of the data packets being transmitted.

When a time slot request is initiated, requiring a conversion from a BL value to a PHY L value, the hardware feeds a BL value from a packet memory 96, which is part of external memory 57, through a fragmentation switch 97 to a first input of a search logic circuit 98, the operation of which is described below in connection with FIG. 7. Switch 97 is in a normal state. In this mode, switch 88 in a state F couples the output of search logic 98 to the address input of reverse lookup table 60 and switch 90 in a state F couples the output of reverse lookup table 60 to a second input of search logic circuit 96. Search logic circuit 96 feeds the correct PHY L value to upstream processor 50.

When a data packet is to be fragmented, switch 97 assumes a fragment state and the BL value of the fragment is coupled from upstream processor 50 through switch 97 to search logic circuit 98 for conversion to a PHY L value.

Figure 7:
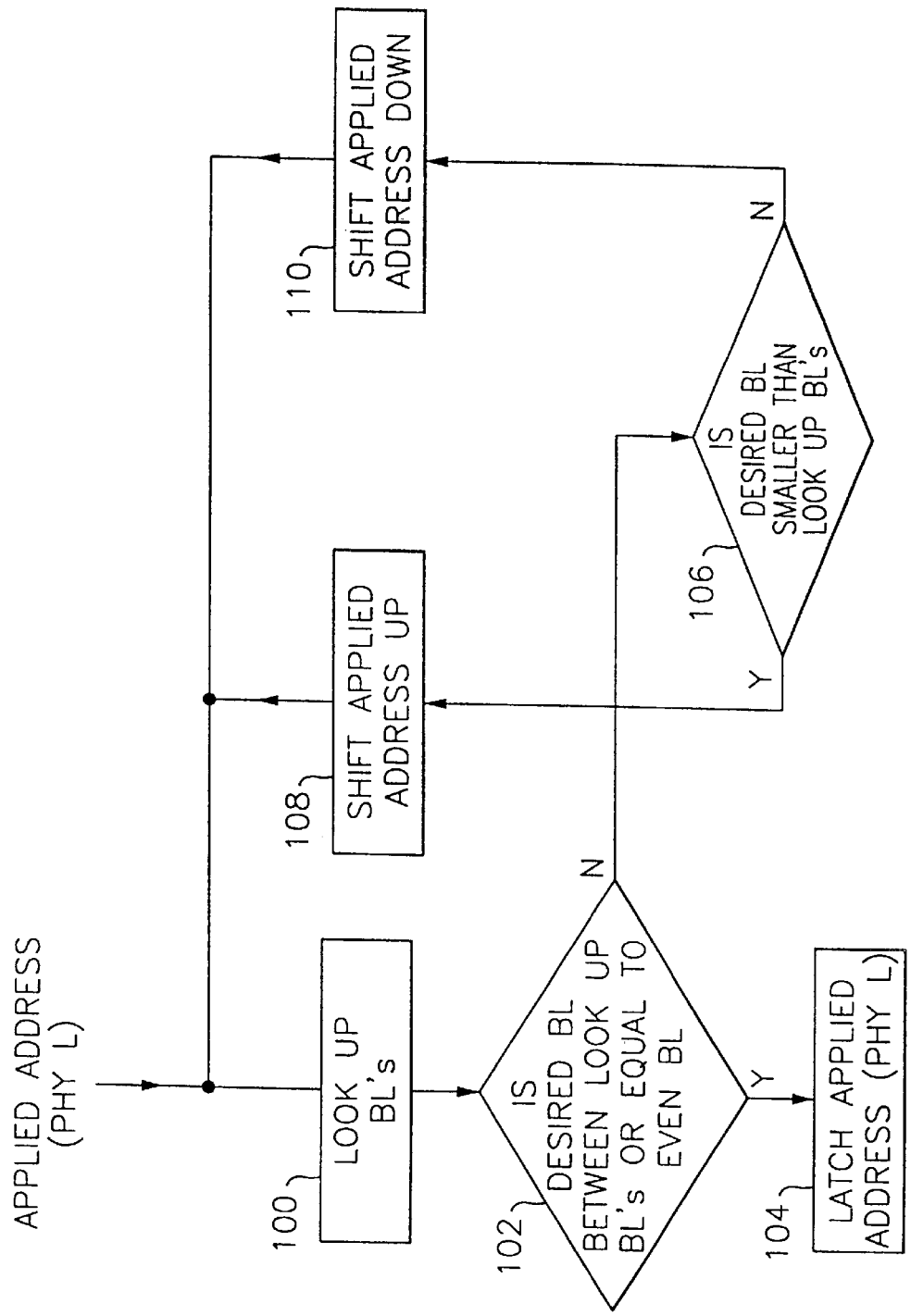
FIG. 7 is a flow diagram showing the operation of a state machine for performing a binary search of the single table of FIG. 6.

The binary search regiment imposed by search logic circuit 96 when reverse lookup table 60 performs the conversion from BL to PHY L is illustrated in FIG. 7. It is assumed that table 60 is divided into two parts. Successive 16-bit BL values are stored in memory locations of the two parts that have the same address. Both parts are addressed simultaneously to speed up the search process. Two successive BL values are retrieved in response to an applied address. State machine 96 first applies an address, i.e., a PHY L value, at the middle of the two part table. The corresponding BL values in table 60 are looked up, as represented by a block 100. As represented by a decision block 102, a comparison between the desired BL and the lookup BLs is made. If the desired BL lies between the lookup BLs or is equal to one of the BLs, namely, the even BL, the Y path is followed to latch the applied address, i.e., the PHY L value, as represented by a block 104. If the desired BL does not lie between the lookup BLs, the N path is followed to a decision block 106. In connection with block 106, a determination is made as to whether the desired BL is larger than the lookup BLs. If the desired BL is larger than the lookup BLs, the Y path is followed to a block 108, which causes an upward shift in the applied address and a return to block 100. If the desired BL is not larger than the lookup BLs, the N path is followed to a block 110, which causes a downward shift in the applied address and a return to block 100. In each case the shift is to the middle of the remainder of the unsearched table. This process is repeated until the desired BL lies between the lookup BLs or is equal to the even lookup BL.

Figure 8:
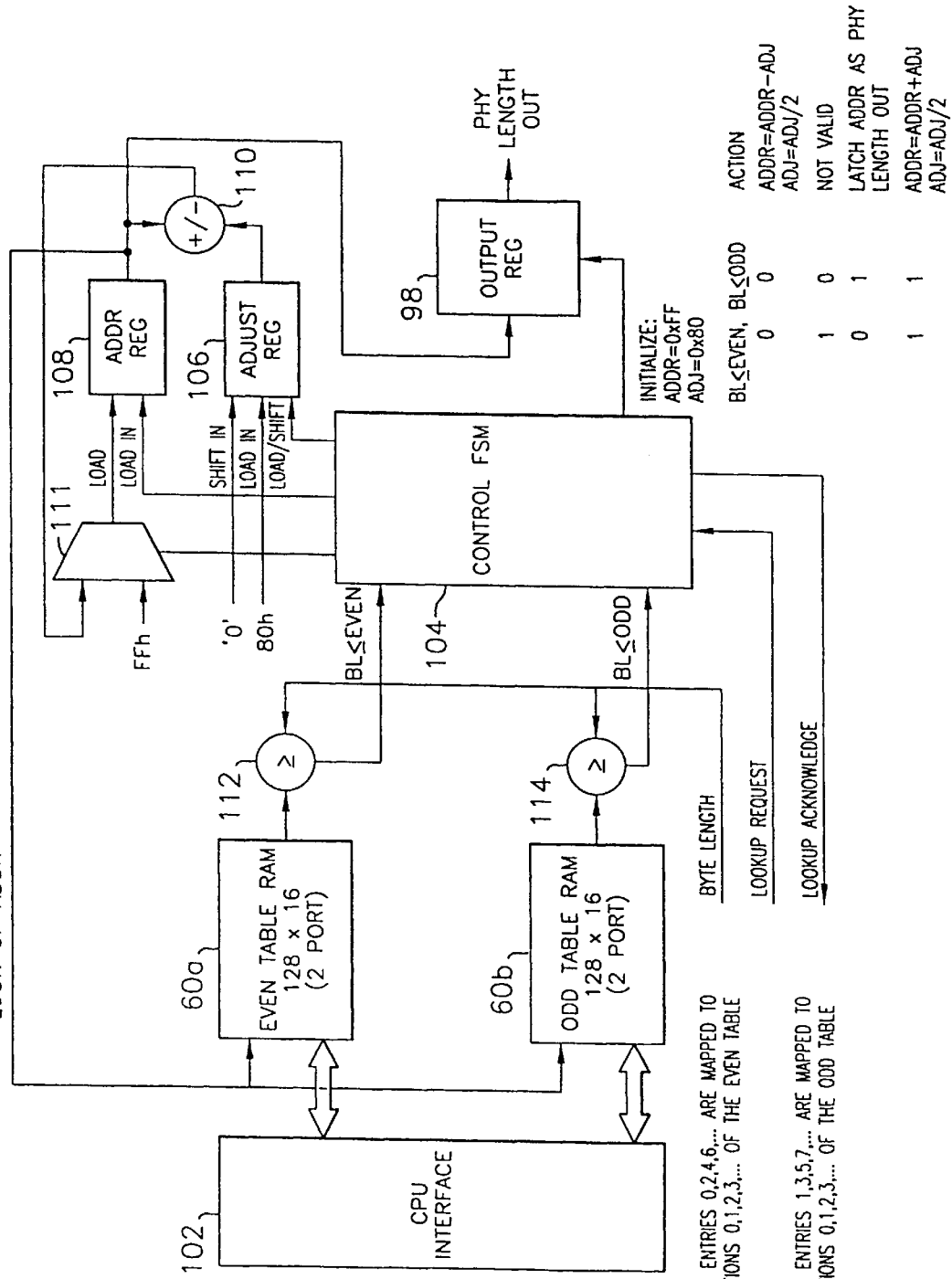
FIG. 8 is a schematic block diagram of circuitry for executing the flow diagram of FIG. 7.

The logic circuitry for performing the binary search is illustrated in more detail in FIG. 8. For purposes of illustration it is assumed that there are 256 consecutive 16-bit words stored in reverse table 60 in monotonically increasing value of BL. Reverse table 60 is subdivided into an even table 60a and an odd table 60b to speed up the search operation. Through a CPU interface 102 are loaded into table 60 such that consecutive table entries are mapped to alternative locations in even table 60a and odd table 60b, i.e., table entries 0, 2, 4, 6, . . . , 254 are mapped to locations 0, 1, 2, 3, . . . , 128 of even table 60a and table entries 1, 3, 5, 7, . . . , 255 are mapped to locations 0, 1, 2, 3, . . . , 128 of odd table 60b. Thus, when a particular table entry is addressed, the odd value is larger than the even value. The conversion of a BL value to a PHY L value is initiated by a lookup request applied to a control finite state machine (FSM) 104 by the hardware. The output of an adjust register (ADJUST REG) 106 and the output of an address register (ADDR REG) 108 are added or subtracted at a junction 110. The output of ADDR REG 108 is also applied to the address inputs of tables 60a and 60b and to output PHY L register 98. The output of junction 110 is applied to an input of a multiplexer 111. The highest address in the table, i.e., FFh, is applied to another input of multiplexer 111. The BL from packet memory 96, hereafter called the "desired BL", and the output of table 60a are applied to comparator 112. Comparator 112 sends a binary "1" to FSM 104 if the output of table 60a is larger than or equal to the desired BL and a binary "0" to FSM 104 if the output of table 60a is smaller than the desired BL. The desired BL and the output of RAM 60b are applied to a comparator 114. Comparator 114 sends a binary "1" to FSM 104 if the output of table 60b is larger than or equal to the desired BL and a binary "0" to FSM 104 if the output of table 60b is smaller than the desired BL. Junction 110 adds or subtracts the outputs of ADJUST REG 106 and ADDR REG 108, depending upon the binary values sent to FSM 104 by comparators 112 and 114. If the binary values are both "1", the contents of ADJUST REG 106 and ADDR REG 108 are added and the value stored in ADJUST REG 106 is divided by two. If the binary values are both "0", the contents of ADJUST REG 106 is subtracted from the contents of ADDR REG 108, and ADDR REG 108 are added and the value stored in ADJUST REG 106 is divided by two. If the binary value sent to FSM 104 by comparator 112 is "1" and the binary value sent to FSM 104 by comparator 114 is "0", FSM sends a command to output register 98 to latch the PHY L value stored therein and sends a lookup acknowledge signal to the hardware.

When table 60a and 60b are accessed by the search logic, the address of both tables comes from ADDR REG 108. Both RAMs in which the tables are stored are forced to the read mode. The address in this case is a word address between 0 and 128. ADDR REG 108, is eight bits, but the LSB is not used to address the RAMs. The LSB is sent to OUTPUT REG 98. There are two ways to complete the search. One is to find BL≦EVEN and not BL≦ODD as shown in FIG. 8. The other is to make eight iterations. ADJUST REG register 106 starts out with a value of 0×80. It is shifted right each iteration through the search taking on values of 0×40, 0×20, 0×10, 0×08, 0×04, 0×02, 0×01, and finally 0×00. If the adjust register gets to 0×00 (i.e. the eighth iteration), then the search concludes and the current eight bit value in ADDR REG 108 is latched in OUTPUT REG. 98. This is the case anytime the desired PHY L is odd.

In summary, the address in register 108 initially points to the middle of tables 60a and 60b. If the desired BL is less than the lookup values, the address in ADDR REG 108 is shifted by the value stored in ADJUST REG 106 so it points at the middle of the bottom half of the table and visa versa. If the desired BL is less than the look up values in bottom half of the table, the address in ADDR REG 108 is shifted again by the value in ADJUST REG 106 so it points at the middle of the bottom quarter of the table and visa versa. Successively smaller values are loaded into ADJUST REG 106 until the desired BL lies between the lookup values or is equal to the larger of the lookup values.

Figure 9:
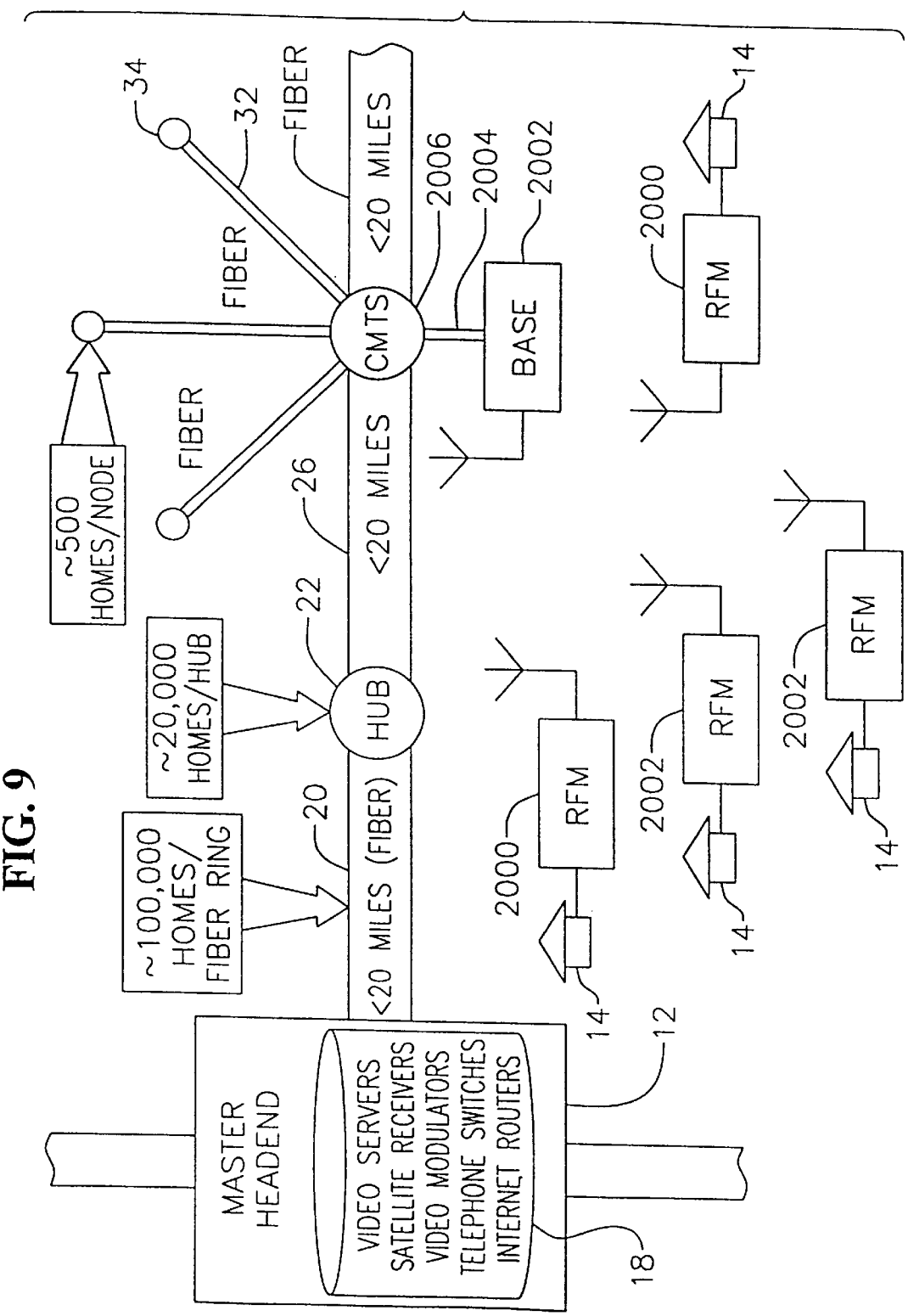
FIGS. 9, 10, and 11 are schmatic diagrams of another environment, namely, a wireless transmission system, in which the invention can be practiced.
Figure 10:
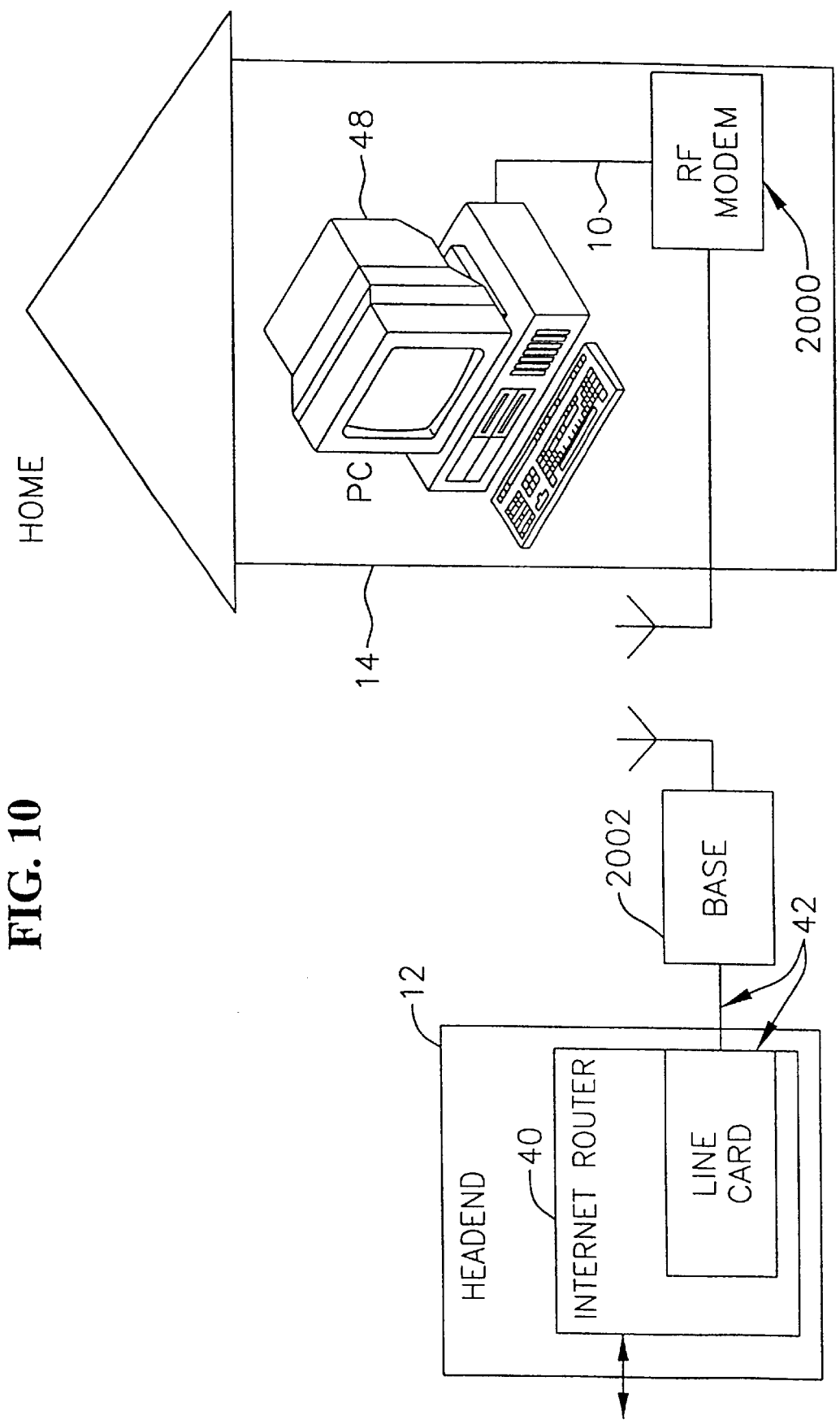

Reference is made to FIGS. 9 and 10 for a description of another embodiment of the invention. In this embodiment, there are wireless transmission links between homes 14 and HFC network 42. Each of homes 14 is equipped with radio frequency modem (RFM) 2000. A base station 2002 is in wireless RF contact with RFM's 2000. The wireless architecture is similar to a cellular phone system. Code division multiple access (CDMA) transmission could be used between RFM's 2000 and base station 2002. Base station 2002 is connected by a fiber 2004 to a CMTS hub 2006. Hub 2006 is part of HFC network 42. Otherwise the components in FIGS. 9 and 10 are the same, and bear the same reference numerals, as those described in connection with FIGS. 1 and 2. As illustrated in FIG. 9, CMTS hub 2006 can be integrated in the same cable system that also services CM's connected by fiber to hub 22. Thus, upstream and/or downstream channels can be installed in a home without physically laying cable all the way to the home. If desired, the downstream channel could be fiber because of the large bandwidth requirement, and the upstream channel could be wireless because there is a smaller bandwidth requirement.

Figure 11:
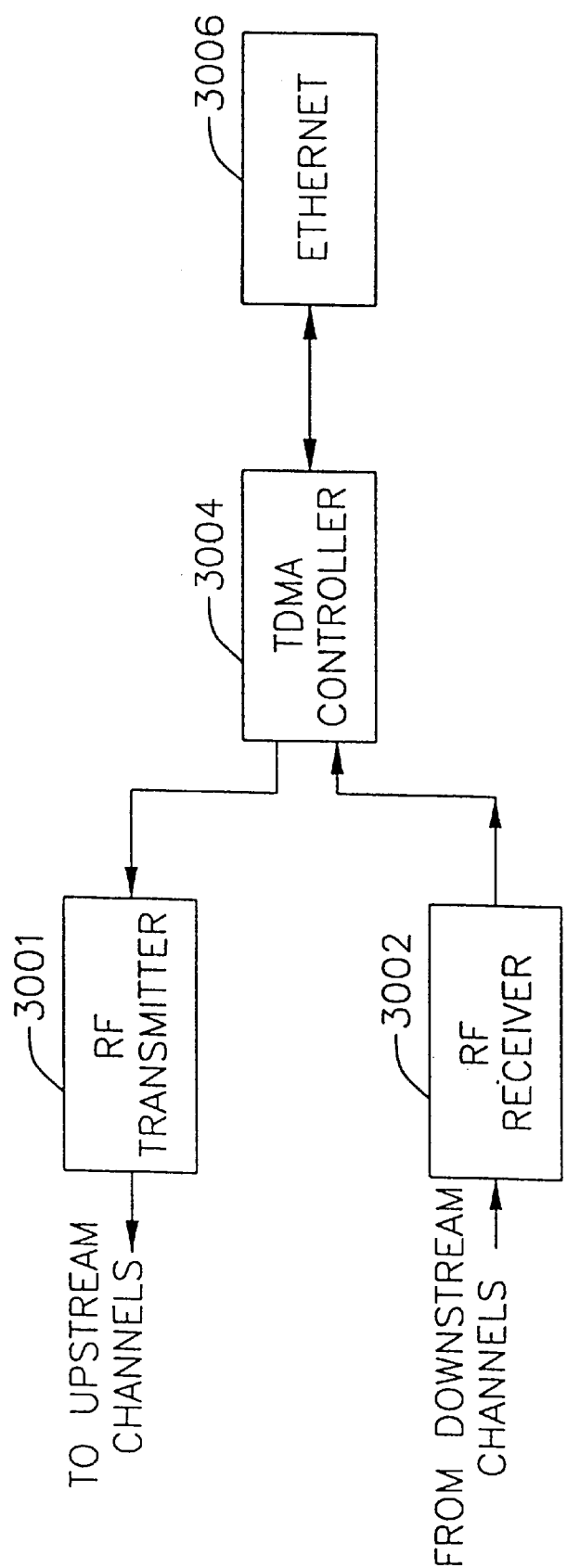

The described functions of cable modems 46 could be carried out on a single integrated circuit chip as illustrated in FIG. 11. In this chip the output of an RF transmitter 3000 feeds the upstream channels of HFC network 42. The downstream channels of HFC network 42 feed the input of an RF receiver 3002. A time division multiple access (TDMA) controller 3004 is connected to the input of transmitter 3000. The output of receiver 3002 is connected to TDMA controller 3004. An ethernet 3006 serves as an interface between TDMA controller 3004 and a PC or other binary signal processing device. TDMA controller 3004 could be an application specific circuit or a microprocessor programmed to perform the described CMTS functions, including fragmentation.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, the forward lookup table could be used as the single table in processing fragmented data packets if it is not important in the particular application to conserve memory space.

What is claimed is:

1. A method for transmitting data packets in a cable modem system, comprising:
   receiving a set of parameters relating to a physical layer of the cable modem system;
   calculating a set of byte length values corresponding to respective physical length values in response to receiving said set of parameters;
   storing said calculated set of byte length values in a lookup table;
   retrieving a first physical length value by accessing said lookup table, said first physical length value corresponding to a first byte length value of a data packet to be transmitted over said physical layer of the cable modem system;
   transmitting a request message including said first physical length value;
   receiving a grant message including a second physical length value;
   retrieving a second byte length value corresponding to said second physical length value by accessing said lookup table, said second byte length value for determining a fragment size for transmitting a fragment of said data packet over said physical layer of the cable modem system.

2. A The method of claim 1, wherein said storing said calculated set of byte length values in a lookup table comprises storing said calculated set of byte length values in a lookup table that is addressable by said respective physical length values.

3. The method of claim 2, wherein said retrieving a first physical length value corresponding to said first byte length value by accessing said lookup table comprises performing a binary search of said lookup table.

4. The method of claim 2, wherein said retrieving a second byte length value corresponding to said second physical length value by accessing said lookup table comprises retrieving a byte length value from a location in said lookup table addressed by said second physical length value.

5. The method of claim 2, further comprising:
   replacing said calculated set of byte length values in said lookup table with a new calculated set of byte length values when a new set of parameters relating to said physical layer of the cable modem system is received.

6. The method of claim 2, further comprising:
   subtracting said second byte length value from said first byte length value to determine a difference byte length value;
   retrieving a third physical length value corresponding to said difference byte length value by accessing said lookup table; and
   transmitting said third physical length value with said fragment of said data packet.

7. A device for transmitting data packets in a cable modem system comprising:
   a central processing unit (CPU) configured to calculate a set of byte length values corresponding to respective physical length values in response to receipt by the device of a set of parameters relating to a physical layer of the cable modem system;
   a memory, wherein said CPU is configured to store said calculated set of byte length values in a lookup table in said memory; and
   hardware adapted to access said lookup table to retrieve a physical length value corresponding to a given byte length value and to retrieve a byte length value corresponding to a given physical length value;
   wherein said hardware retrieves a first physical length value for inclusion in a request message, said first physical length value corresponding to a first byte length value of a data packet to be transmitted from the device, and
   wherein said hardware retrieves a second byte length value for determining a fragment size for transmitting a fragment of said data packet from the device, said second byte length value corresponding to a second physical length value included in a grant message received by the device.

8. The device of claim 7, wherein said memory comprises a random access memory (RAM).

9. The device of claim 7, wherein said lookup table is addressable by said respective physical length values.

10. The device of claim 9, wherein said hardware comprises search logic, said search logic adapted to perform a binary search of said lookup table to retrieve a physical length value corresponding to a given byte length value.

11. The device of claim 9, wherein said hardware is adapted to retrieve a byte length value from a location in said lookup table addressed by a given physical length value.

12. The device of claim 7, wherein said CPU is further adapted to calculate a new set of byte length values corresponding to respective physical length values in response to receipt by the device of a new set of parameters relating to a physical layer of the cable modem system and to store said new calculated set of byte length values in said lookup table.

13. The device of claim 7, wherein said hardware is further adapted to subtract said second byte length value from said first byte length value to determine a difference byte length value and to retrieve a third physical length value corresponding to said difference byte length value by accessing said lookup table, said third physical length value for inclusion with said fragment of said data packet for transmission from the device.

14. A device for transmitting data packets in a cable modem system comprising:

means for calculating a set of byte length values corresponding to respective physical length values in response to receipt by the device of a set of parameters relating to a physical layer of the cable modem system;

a memory comprising a lookup table for storing said calculated set of byte length values; and processing means for accessing said lookup table to retrieve a physical length value corresponding to a given byte length value and to retrieve a byte length value corresponding to a given physical length value;

wherein said processing means comprises means for retrieving a first physical length value for inclusion in a request message, said first physical length value corresponding to a first byte length value of a data packet to be transmitted from the device, and wherein said processing means comprises means for retrieving a second byte length value for determining a fragment size for transmitting a fragment of said data packet from the device, said second byte length value corresponding to a second physical length value included in a grant message received by the device.

15. The device of claim 14, wherein said memory comprises a random access memory (RAM).

16. The device of claim 14, wherein said lookup table is addressable by said respective physical length values.

17. The device of claim 16, wherein said processing means comprises search means for performing a binary search of said lookup table to retrieve a physical length value corresponding to a given byte length value.

18. The device of claim 16, wherein said processing means comprises means for retrieving a byte length value from a location in said lookup table addressed by a given physical length value.

19. The device of claim 14, wherein said means for calculating comprises means for calculating a new set of byte length values corresponding to respective physical length values in response to receipt by the device of a new set of parameters relating to a physical layer of the cable modem system, said new calculated set of byte length values for storage in said lookup table.

20. The device of claim 14, wherein said processing means comprises means for subtracting said second byte length value from said first byte length value to determine a difference byte length value and for retrieving a third physical length value corresponding to said difference byte length value by accessing said lookup table, said third physical length value for inclusion with said fragment of said data packet for transmission from the device.

* * * * *

UNITED STATES PATENT AND TRADEMARK OFFICE
CERTIFICATE OF CORRECTION

PATENT NO. : 6,606,352 B2  
DATED : August 12, 2003  
INVENTOR(S) : Horton, Jr. et al.

It is certified that error appears in the above-identified patent and that said Letters Patent is hereby corrected as shown below:

Title page, Item [54] and Column 1, line 4,
Please replace "MODEM" with -- CABLE MODEM --.

Title page,
Item [56], References Cited, U.S. PATENT DOCUMENTS, please insert
-- U.S. Pat. No. 5,841,777 -- and -- U.S. Pat. No. 5,917,822 --.

Column 11,
Line 59, please replace "A The method" with -- The method --.

Signed and Sealed this

Twenty-fifth Day of May, 2004

JON W. DUDAS  
*Acting Director of the United States Patent and Trademark Office*